United States Patent [19]

Sorensen

[11] 4,427,618

[45] Jan. 24, 1984

[54] INCLINED INSULATED RUNNER MULTICAVITY INJECTION MOLDING

[76] Inventor: Jens O. Sorensen, P.O. Box 2274, Rancho Santa Fe, Calif. 92067

[21] Appl. No.: 446,640

[22] Filed: Dec. 3, 1982

Related U.S. Application Data

[63] Continuation of Ser. No. 230,300, Jan. 30, 1981, abandoned.

[51] Int. Cl.³ .............................................. B29F 1/08
[52] U.S. Cl. .............................. 264/328.9; 264/328.8; 264/328.14; 264/328.16; 425/DIG. 51
[58] Field of Search ............ 264/328.8, 328.9, 328.14, 264/329.16; 425/DIG. 51

[56] References Cited

U.S. PATENT DOCUMENTS

| | | | |
|---|---|---|---|
| 3,021,568 | 2/1962 | Scott | 264/328.14 |
| 3,776,676 | 12/1973 | Kessler | 264/328.14 X |
| 3,847,526 | 11/1974 | Fries | 425/DIG. 51 X |

FOREIGN PATENT DOCUMENTS 44-21230  9/1969  Japan .......................... 425/DIG. 51

*Primary Examiner*—Thomas P. Pavelko

[57] ABSTRACT

A system and a method of multicavity injection molding of a product, where the gate cannot be placed, as traditionally, at the top of the product, but must be placed at the side of the product; this is accomplished by using inclined secondary runners; the process is exceedingly fast since the secondary runners are not heated in their basic form; disclosed is also the method and means for employing polystyrene as the injection molding material.

6 Claims, 5 Drawing Figures

INCLINED INSULATED RUNNER MULTICAVITY INJECTION MOLDING

This is a continuation of application Ser. No. 230,300 filed Jan. 30, 1981 now abandoned.

FIELD OF THE INVENTION

The invention generally pertains to insulated runner multicavity injection molding of plastic and is particularly directed to injection molding a product in such a manner that the angle of inclination to the injection point of the surface of the product is not the typical 0°, but may be up to 90°.

The angle of inclination to the injection point of the surface of an injection molded product is here defined to mean: the smallest angle that the normal to the injection point makes with the production mold ejection opening direction.

The normal to the injection point of the surface of the product is here defined to mean: a line going through the injection point so that the line is perpendicular to the tangent plane to the injection point of the surface of the product.

There may be a number of reasons for choosing to place the injection point of the surface of an injection molded product so that the angle of inclination is significantly larger than 0°, perhaps close to 90°. Some of these reasons are larger strength, less deformation or more beauty of the molded product.

CROSS REFERENCE TO RELATED APPLICATION

This application is cross referenced to a related copending application filed on the same date herewith for Cooled Runner Multicavity Injection Molding of Polystyrene by the same inventor.

DISCUSSION OF PRIOR ART

Heretofore multicavity insulated runner injection molding of a product with a small angle of inclination to the injection point of up to about 20° has been solved successfully by employing secondary gate runners which are not inclined.

An inclined secondary gate runner is defined to mean: a secondary runner which connects the primary runner system with a restricted gate and which when solidified must be removed in a direction so that the plastic impression of the gate on the plastic impression of the secondary runner is carried through the secondary runner in a direction which is not parallel to the mold opening direction.

But in the situation where the angle of inclination has been more than about 20°, multicavity insulated runner injection molding has not been possible and manufacturing of products with an angle of inclination to the injection point of more than about 20° has had to be produced with other multicavity injection molding systems such as the submarine gate runner injection molding system or the hot runner injection molding system. Both of these systems have distinct disadvantages. In the submarine gate runner injection molding system a plastic impression of the submarine gate runner is produced simultaneously with the molded product. First this plastic impression has to be sorted from the molded product and then recycled by some costly process into the injection molding process. In the hot runner injection molding system the production cycle period is relatively long because some heat leaks from the heated hot runner manifold via the hot runner nozzles to the walls of the chilling cavities, thereby extending the required cooling period of the molded product. Impurities often get trapped in the hot runner system, thereby plugging the hot runner nozzle. Electrical heating elements often stop functioning, causing the hot runner system to freeze. Hot molten plastic often leaks out of the hot runner system, causing loss of material and reduced injection pressure and short circuited electrical heating elements.

OBJECTS OF THE INVENTION

It is the object of the invention to disclose a system and a method of inclined insulated runner multicavity injection molding which is not burdened by the problems and disadvantages of the submarine gate runner and hot runner systems and methods. Inclined insulated runner multicavity injection molding does not during its normal production cycle simultaneously produce any runner plastic impression which must be sorted from the molded product and recycled into the molding process. Inclined insulated runner multicavity injection molding has a short production cycle, does not easily trap impurities, is not dependent on heating elements and the leaking problem is solved.

Further objects and advantages of my invention will become apparent from a consideration of the drawings and ensuing description thereof.

SUMMARY OF THE INVENTION

The present invention discloses a system and a method of cyclic insulated runner multicavity plastic injection molding wherein the method of each production cycle comprises the steps of:

(a) injecting a hot molten plastic into a primary runner system of a multicavity mold.

(b) directing the injected plastic through the primary runner system to some inclined secondary runners which connect the primary runner system with some restriction gates.

(c) leading the directed plastic through the inclined secondary runners to the restriction gates which connect the inclined secondary runners with the chilling cavities.

(d) cooling the led plastic in the inclined secondary runners by transferring heat from the plastic to the walls of the inclined secondary runners which have a temperature which is lower than the temperature of the led plastic in a manner so that the plastic in the inclined secondary runners does not solidify in their entire cross-sectional region but remains molten in a central zone of their cross-sectional region.

(e) conducting the led cooled molten plastic through the restriction gates into the chilling cavities.

(f) cooling the conducted plastic in the chilling cavities by a cavity cooling system whereby the cooled plastic solidifies, thereby creating a molded product.

(g) ejecting the molded product from the chilling cavities.

The steps (a), (b), (c), (d), (e), (f), and (g) comprise a normal production cycle. When for some reason such as malfunction or intent, the normal production cycle is terminated, then the led molten plastic within the inclined secondary runners transfers additional heat to the walls of the inclined secondary runners whereby the molten plastic solidifies throughout its entire cross-sectional region. The normal production cycle may hereafter be re-established by the method additionally comprising the steps of:

(h) separating the mold part which contains the inclined secondary runners into two sections in order to expose the solidified impressions of the inclined secondary runners.

(i) removing the solidified impressions of the inclined secondary runners in such a manner that the impressions of the restriction gate on the solidified impressions of the inclined secondary runners are removed through the inclined secondary runner in a direction which is not parallel to the mold opening direction.

(j) recombining the two sections of the mold part which contain the inclined secondary runners.

The steps (h), (i) and (j) may hereafter be followed by the steps of the normal production cycle.

I have successfully experimented with a modified insulated runner system which I call "the cooled runner system" for multicavity injection molding of polystyrene.

The cooled runner system differs from the insulated runner system because in order to successfully injection mold polystyrene in a prior art insulated runner mold made to injection mold for instance a polyolefine, it is necessary to make the following major alterations from the minimum requirements needed in order to injection mold the polyolefine:

(1) it is customary when injection molding a polyolefine and employing an insulated runner system to increase the temperature of the injected polyolefine from the temperature required of such injected polyolefine when employing a hot runner system; in the case of a polystyrene this increase in temperature must be larger.

(2) it is customary when injection molding a polyolefine and employing an insulated runner system to increase the pressure of the injected polyolefine from the pressure required of such injected polyolefine when employing a hot runner system; in the case of a polystyrene this increase must also be larger.

(3) the cross-sectional areas of the primary runner system must be enlarged.

(4) the cross-sectional areas of the secondary feeding runners must be enlarged.

(5) the cross-sectional areas of the gate restrictions must be enlarged.

(6) the frequency of the normal production cycle must be increased.

My experiments proved not only that the cooled runner system was possible, but my experiments also disclosed the surprising result that the cooling period could be reduced by approximately one second in each production cycle from the normal cooling period obtainable with a standard hot runner system.

Figure 3:
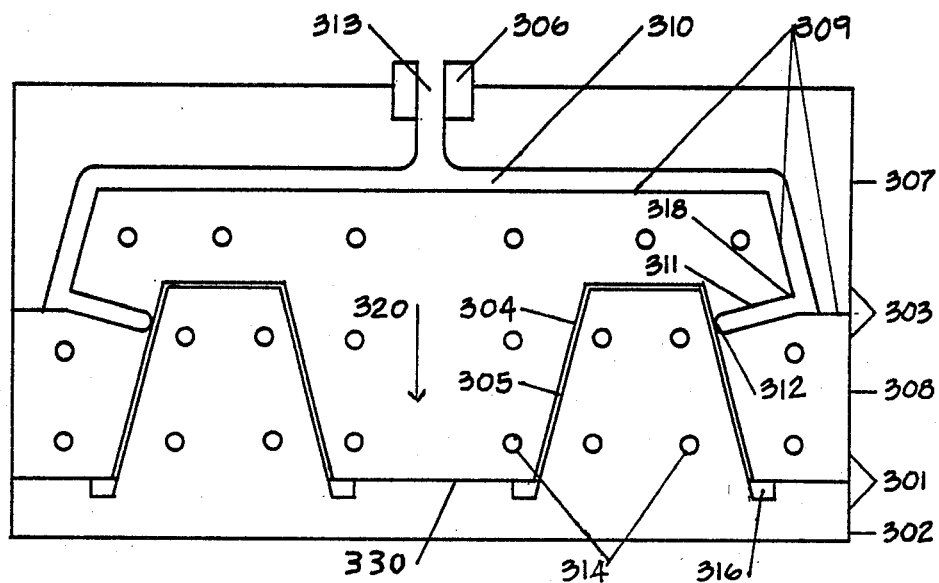
FIGS. 3, 4, and 5 are preferred embodiments and each are a schematic detailed diagram of a different production mold positioned like the mold shown in FIG. 1.
Figure 5:
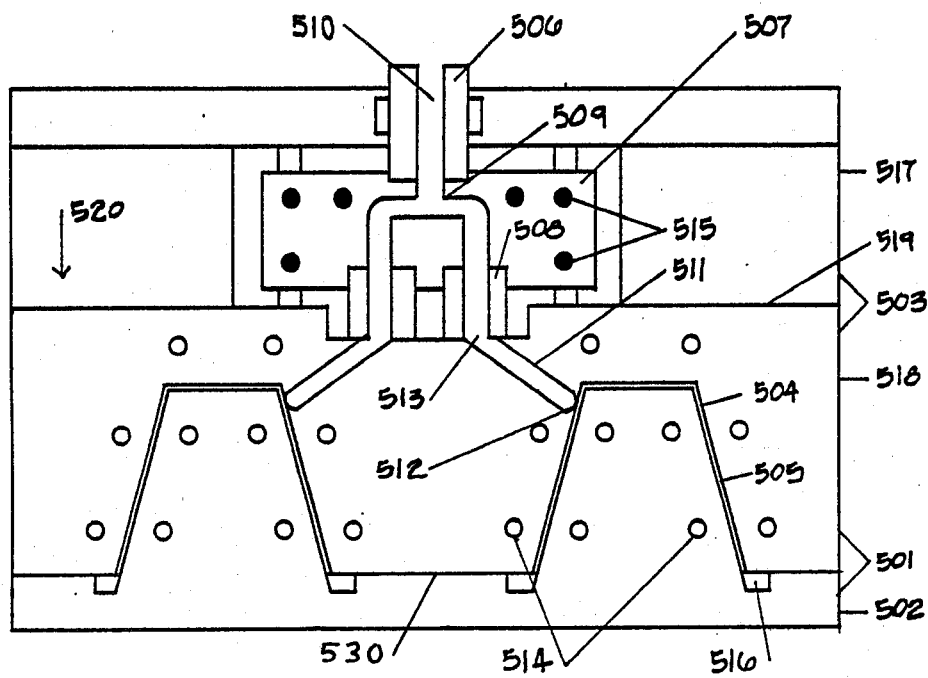
Figure 4:
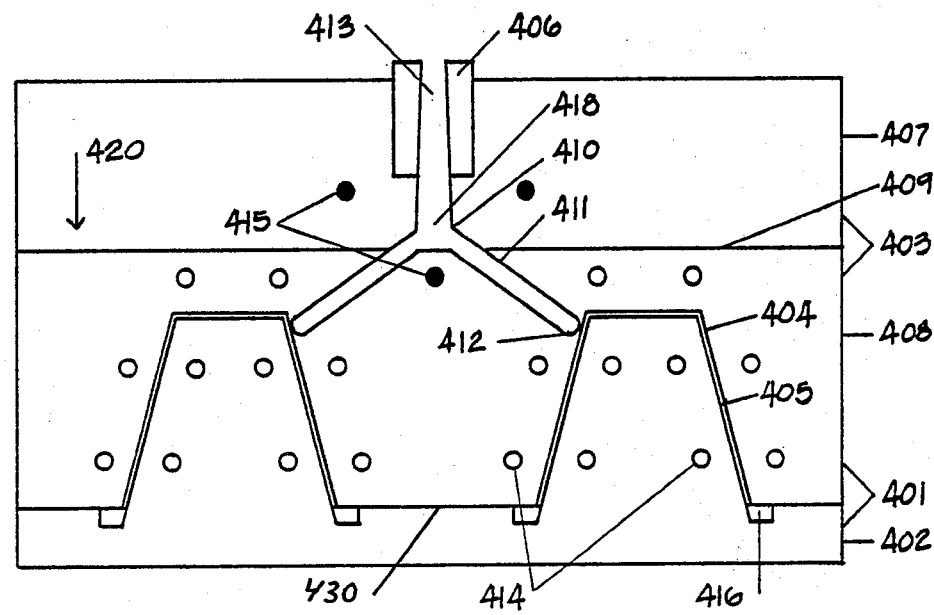

The short cooling period is an important contributing reason that the hot molten polystyrene in the hot runner system does not freeze, since there is not enough heat loss during the short cycle time available to cause the hot molten plastic in the runner system to freeze. FIGS. 3, 4, and 5 also illustrate examples of cooled runner injection molding of polystyrene.

DETAILED DESCRIPTION OF THE DRAWINGS

Figure 1:
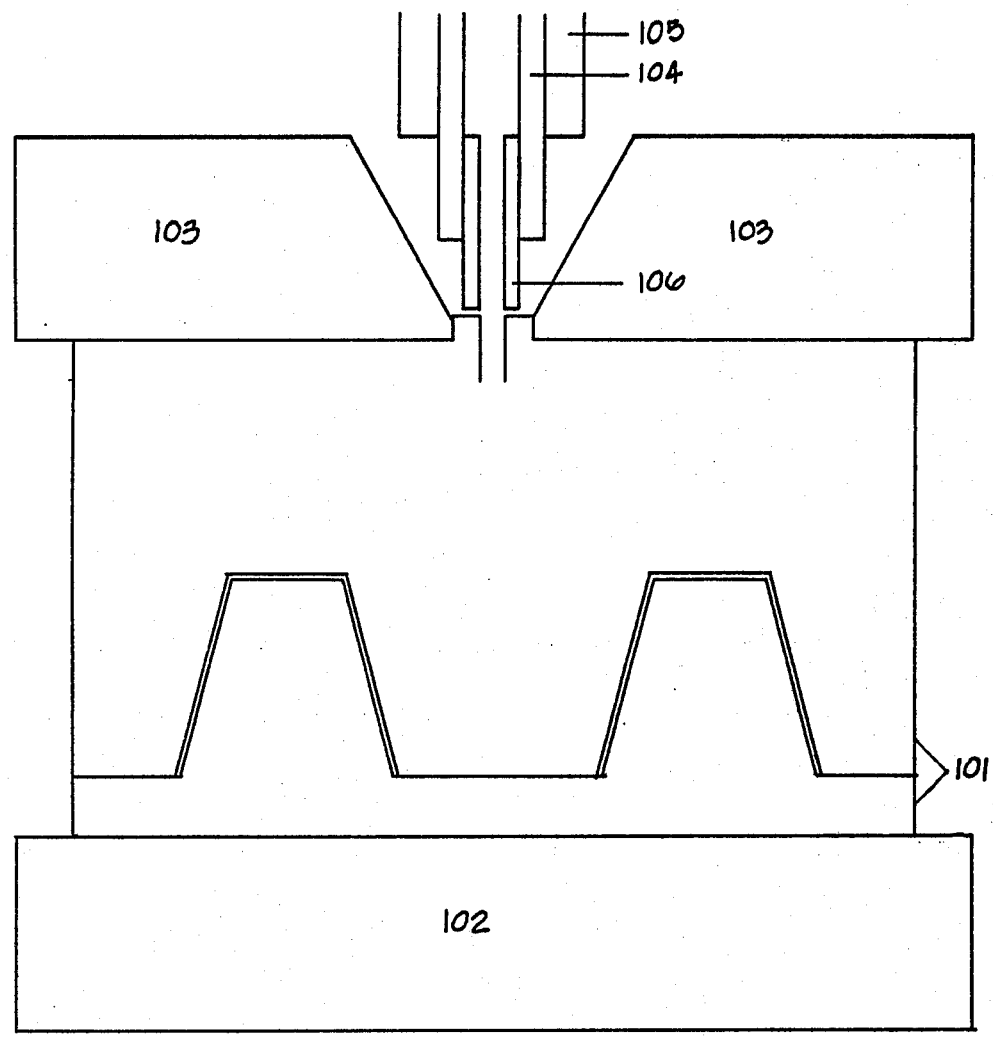
FIG. 1 is a schematic diagram of a production mold positioned in gross view without detail.

FIG. 1. Illustrated is a production mold 101 which may be any one of the molds described in FIGS. 2, 3, 4, and 5 below. The production mold 101 is positioned in a clamping unit consisting of moveable part 102 and the stationary part 103. Also illustrated is an injection unit 104 with a heating element 105 and an injection nozzle 106.

Figure 2:
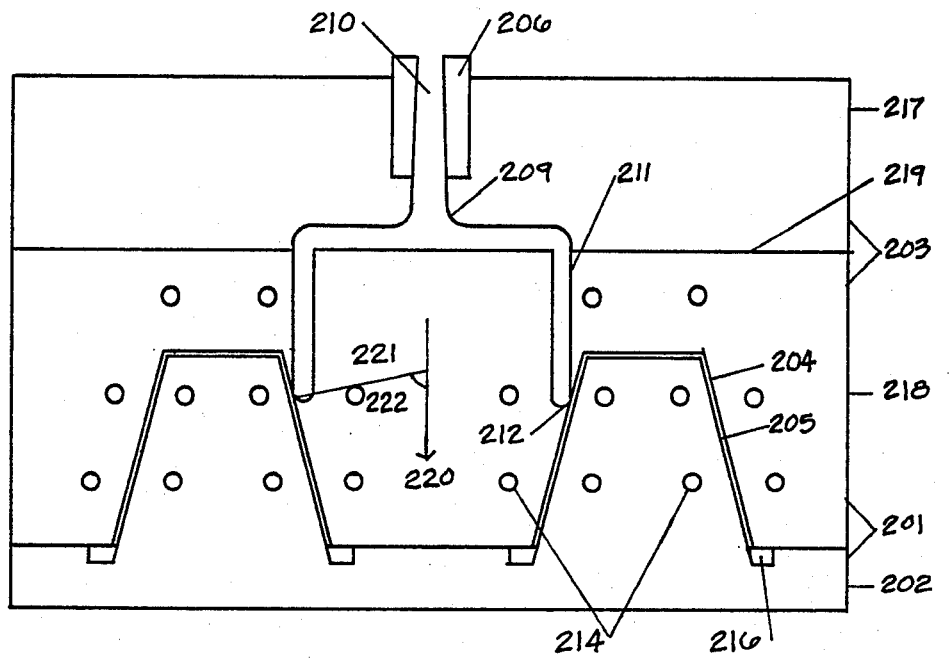
FIG. 2 is an unsuccessful schematic detailed diagram of a prior art production mold positioned like the mold illustrated in FIG. 1.

FIG. 2. Illustrated in an unsuccessful prior art insulated runner mold 201 with a moveable mold part 202 which is connected to the moveable clamping unit part 102 and a stationary mold part 203 which is connected to the stationary clamping unit part 103. The mold 203 includes two chilling cavities 204, each for enclosing a molded product 205 such as a drinking glass. The mold 201 also includes a sprue bushing 206 which meets the injection nozzle 106. The sprue bushing 206 is inserted in a first section 217 of the stationary mold part 203. The first section 217 is attached to a second section 218 of the stationary mold part 203 and separated therefrom by a parting surface 219. A primary runner system 209 is channelled through the sprue bushing 206, the first stationary mold section 217 and divides into two branches positioned in the parting surface 219. As a continuation of the primary runner system 209, is secondary runners 211 which are not inclined and which are positioned in the second stationary mold section 218. The secondary runners 211 lead through restriction gates 212 to chilling cavities 204. Inside the primary runner system 209 and the secondary runners 211 is plastic 210. The walls of the chilling cavities 204 contain a cavity cooling system 214. Each chilling cavity 204 has a stripper sleeve 216. Illustrated is also mold opening direction 220, the normal 221 to the injection point 212 of the surface of the product 205 and the resulting angle of inclination 222 which is about 60° in this figure.

The operation of the system which is illustrated in FIG. 2 and which is positioned as illustrated in FIG. 1 is as follows: hot molten plastic 210 is injected by the injection unit 104 through the injection nozzle 106 into the primary runner system 209. The plastic is directed through the primary runner system 209 with a circular cross-sectional area to the secondary runners 211 also with circular cross-sectional areas, through the restriction gates 212 with circular cross-sectional areas, and into the chilling cavities 204. While the molten plastic flows through the primary runner system 209 and the secondary runners 211, heat is transferred to the walls of the primary runner system 209 and the secondary runners 211, which have a temperature which is lower than the temperature of the flowing polystyrene because the walls are cooled by the cavity cooling system 214 whereby the plastic in the primary runner system 209 and in the secondary runners 211 does not solidify in their entire circular cross-sectional region but remains molten in a central zone of their circular cross-sectional region.

The solid outer contours of the cross-sectional region helps to reduce or prevent any leakage of molten plastic which may leak from the primary runner system 209 out at the parting surface 219. The plastic which has entered the chilling cavities 204 is cooled by the cavity cooling system 214 whereby the cooled plastic solidifies, thereby creating a molded product 205.

The moveable clamping unit part 102 is moved away from the stationary clamping unit part 103 whereby the moveable mold part 202 is separated from the stationary mold part 203 and the molded product 205 is ejected by the stripper sleeve 214. Then the moveable clamping unit part 102 is moved toward the stationary clamping unit part 103 whereby the moveable mold part 202 is combined with the stationary mold part 203, which ends the normal production cycle and a new cycle is ready to begin.

When for some reason such as intent or malfunction, like an impurity plugging a restriction gate 212, the normal production cycle is terminated, then the molten polystyrene within the primary runner system 210 and secondary runners 211 loses additional heat to the walls of the primary runner system 210 and the secondary runners 211, causing the molten polystyrene to solidify throughout its entire cross-sectional region, the normal production cycle may hereafter be re-established by attaching the second stationary mold section 218 to the moveable clamping unit part 102 and disconnecting the second stationary mold section 218 from the first stationary mold section 217. Then the moveable clamping unit part 102 is moved away from the stationary clamping unit 103 whereby the second stationary mold section 218 is separated from the first stationary mold section 217 in order to expose the combined unit of the solidified impression of the polystyrene in the primary runner system 209 and the solidified impressions of the polystyrene in the secondary runners 211. The combined unit is hereafter removed and the moveable clamping unit part 102, is moved towards the stationary clamping unit 103 whereby the second stationary mold section 218 is combined with the first stationary mold section 217 in order to reattach the second stationary mold section 218 with the first stationary mold section 217 and disconnect the second stationary mold section 218 with the moveable clamping unit part 102, which leaves the system ready for the normal production cycle to begin.

The reason that the system just described is not successful is that the wall between the secondary runners 211 which are not inclined and the chilling cavity 204 is very thin, and will in an uneconomically short time deteriorate, thereby increasing the area of the cross-sectional region of the restriction gates 212 to prevent further production.

FIG. 3. Illustrated is a first preferred embodiment of this invention. A cooled runner mold 301 has a moveable mold part 302 which is connected to the moveable clamping unit part 102 and a stationary mold part 303 which is connected to the stationary clamping unit 103 the separating surface between the moveable mold part 302 and the stationary mold part 303 is named the product parting surface 330. The cooled runner mold 301 includes two chilling cavities 304 each for enclosing a molded product 305 such as a drinking glass with a wall thickness of 0.7 mm. The cooled runner mold 301 also includes a sprue bushing 306 which meets the injection nozzle 106. The sprue bushing 306 is inserted in a first section 307 of the stationary mold part 303. The first section 307 is attached to a second section 308 of the stationary mold part 303 and separated therefrom by a runner parting surface 309. A primary runner system 310 is channelled through the sprue bushing 306, the first stationary mold section 307 and divides into two branches positioned in the runner parting surface 309. As a continuation of the primary runner system 310, is inclined secondary runners 311 positioned in the second stationary mold section 308. The inclined secondary runners 311 lead through restriction gates 312 to chilling cavities 304.

Inside the primary runner system 310 and the secondary runners 311 is polystyrene 313. The walls of the chilling cavities 304 contain a cavity cooling system 314. Each chilling cavity 304 has a stripper sleeve 316. Illustrated is also mold opening direction 320.

The operation of the system which is illustrated in FIG. 3 and which is positioned as illustrated in FIG. 1, is as follows: hot molten high impact polystyrene 313 at a temperature of 250 degrees Centigrade and a pressure of 1500 kg per sq. cm. is injected by the injection unit 104 through the injection nozzle 106 into the primary runner system 310. The polystyrene is directed through the primary runner system 310 with a circular cross-sectional area with an average diameter of 14 mm to the inclined secondary runners 311 with circular cross-sectional areas with an average diameter of 14 mm and is conducted through the restriction gates 312 with circular cross-sectional areas with an average diameter of 1.8 mm into the chilling cavities 304. While the molten polystyrene flows through the primary runner system 310 and the inclined secondary runners 311, heat is transferred to the wall of the primary runner system 310 and the walls of the inclined secondary runners 311, which have a temperature which is lower than the temperature of the flowing polystyrene because the walls are cooled by the cavity cooling system 314 whereby the polystyrene in the primary runner system 310 and in the inclined secondary runners 311 does not solidify in their entire circular cross-sectional region but remains molten in a central zone of their circular cross-sectional region. The solid outer contours of the cross-sectional region help to reduce or prevent any leakage of molten polystyrene which may leak from the primary runner system 310 out at the runner parting surface 309. The polystyrene which has entered the chilling cavities 304 is cooled in a short cooling period of 1.2 seconds by the cavity cooling system 314 whereby the cooled polystyrene solidifies, thereby creating a molded product 305.

The moveable clamping unit part 102 is moved away from the stationary clamping unit part 103 whereby the moveable mold part 302 is separated from the stationary mold part 303 and the molded product 305 is ejected by the stripper sleeve 316. Then the moveable clamping unit part 102 is moved toward the stationary clamping unit part 103 whereby the moveable mold part 302 is combined with the stationary mold part 303, which ends the normal production cycle with a cycle time of 2.3 seconds, and a new cycle is ready to begin.

When for some reason such as intent or malfunction, like an impurity plugging a restriction gate 312, even though this gate has the large cross-sectional diameter of 1.8 mm, the normal production cycle is terminated, then the molten polystyrene within the primary runner system 310 and inclined secondary runners 311 loses additional heat to the walls of the primary runner system 310 and the inclined secondary runners 311, causing the molten polystyrene to solidify throughout its entire cross-sectional region. The normal production cycle may hereafter be re-established by attaching the second stationary mold section 308 to the moveable clamping unit part 102 and disconnecting the second stationary mold section 308 from the first stationary mold section 307. Then the moveable clamping unit part 102 is moved away from the stationary clamping unit 103 whereby the second stationary mold section 308 is separated from the first stationary mold section 307 in order to expose the combined unit 318 of the solidified impression of the polystyrene in the primary runner system 310 and the solidified impressions of the polystyrene in the inclined secondary runners 311. The combined unit 318 is hereafter removed in such a manner that the impressions of the restriction gate 312 on the solidified impression of the inclined secondary runners 311 is removed through the inclined secondary runners 311 in a direction which is not parallel to the mold opening direction 320. It is necessary to subdivide the combined unit 318 by breaking off the solidified impression of the primary injection system 310 in order to remove the solidified impressions of the inclined secondary runners 311, and the moveable clamping unit part 102 is moved towards the stationary clamping unit 103 whereby the second stationary mold section 308 is combined with the first stationary mold section 307 in order to re-attach the second stationary mold section 308 with the first stationary mold section 307 and disconnect the second stationary mold section 308 with the moveable clamping unit part 102, which leaves the system ready for the normal production cycle to begin.

Since the secondary runners 311 are inclined, the wall between the secondary runners 311 and the chilling cavity 304 is not made so thin that it will deteriorate.

FIG. 4. Illustrated is a second preferred embodiment of the invention.

A cooled runner mold 401 has a moveable mold part 402 which is connected to the moveable clamping unit part 102 and a stationary mold part 403 which is connected to the stationary clamping unit 103 the separating surface between the moveable mold part 402 and the stationary mold part 403 is named the product parting surface 430. The cooled runner mold 401 includes two chilling cavities 404, each for enclosing a molded product 405 such as a drinking glass with a wall thickness of 0.55 mm. The cooled runner mold 401 also includes a sprue bushing 406 which meets the injection nozzle 106 and is inserted in a first section 407 of the stationary mold part 403. The first section 407 is attached to a second section 408 of the stationary mold part 403 and separated by a runner parting surface 409. A primary runner system 410 is channelled through the sprue bushing 406, the first stationary mold section 407 and divides into two branches positioned in the runner parting surface 409. As a continuation of the primary runner system 410, is inclined secondary runners 411 positioned in the second stationary mold section 408. The secondary runners 411 lead through restriction gates 412 to chilling cavities 404.

Inside the primary runner system 410 and the secondary runners 411 is polystyrene 413. The walls of the chilling cavities 404 contain a cavity cooling system 414. The walls of the stationary mold part 403 contain a runner cooling system 415. Each chilling cavity 404 has a stripper sleeve 416.

Illustrated is also mold opening direction 420.

The operation of the system which is illustrated in FIG. 4 and which is positioned as illustrated in FIG. 1, is as follows: hot molten general-purpose polystyrene at a temperature of 270 degrees Centigrade and a pressure of 1500 kg per sq. cm. is injected by the injection unit 104 through the injection nozzle 106 into the primary runner system 410. The polystyrene is directed through the primary runner system 410 with a circular cross-sectional area with an average diameter of 13 mm to the inclined secondary runners 411, with circular cross-sectional areas with an average diameter of 13 mm and is conducted through the restriction gates 412 with circular cross-sectional areas with an average diameter of 1.6 mm into the chilling cavities 404. While the molten plastic flows through the primary runner system 410 and the inclined secondary runners 411 heat is transferred to the walls of the primary runner system 410 and the walls of the inclined secondary runners 411, which have a temperature which is lower than the temperature of the flowing polystyrene because the walls are cooled by the runner cooling system 415 whereby the polystyrene in the primary runner system 410 and in the inclined secondary runners 411 does not solidify in their entire circular cross-sectional region but remains molten in a central zone of their circular cross-sectional region.

The solid outer contours of the cross-sectional region help to reduce or prevent any leakage of the molten polystyrene which may leak from the primary runner system 410 out at the runner parting surface 409. The polystyrene which has entered the chilling cavities 404 is cooled in a short cooling period of 0.9 seconds by the cavity cooling system 414 whereby the cooled polystyrene solidifies thereby creating a molded product 405.

The moveable clamping unit part 102 is moved away from the stationary clamping unit part 103 whereby the moveable mold part 402 is separated from the stationary mold part 403 and the molded product 405 is ejected by the stripper sleeve 416. Then the moveable clamping unit part 102 is moved toward the stationary clamping unit part 103 whereby the moveable mold part 402 is combined with the stationary mold part 403, which ends the normal production cycle with a cycle period of 2.0 seconds, and a new cycle is ready to begin.

When for some reason such as intent, or malfunction, like an impurity plugging a restriction gate 412, even though this gate has the large cross-sectional diameter of 1.6 mm, the normal production cycle is terminated, then the molten polystyrene within the primary runner system 410 and inclined secondary runners 411 loses additional heat to the walls of the primary runner system 410 and the secondary runners 411, causing the molten polystyrene to solidify throughout its entire cross-sectional region. The normal production cycle may hereafter be re-established by attaching the second stationary mold section 408 to the moveable clamping unit part 102 and disconnecting the second stationary mold section 408 from the first stationary mold section 407. Then the moveable clamping unit part 102 is moved away from the stationary clamping unit 103 whereby the second stationary mold section 408 is separated from the first stationary mold section 407 in order to expose the combined unit 418 of the solidified impression of the polystyrene in the primary runner system 410 and the solidified impressions of the polystyrene in the inclined secondary runners 411. The combined unit 418 is hereafter removed in such a manner that the impressions of the restriction gate 412 on the solidified impression of the inclined secondary runners 411 are removed through the inclined secondary runners 411 in a direction which is not parallel to the mold opening direction 420. It is necessary to subdivide the combined unit 418 by breaking off the solidified impression of the primary injection system 410 in order to remove the solidified impressions of the inclined secondary runners 411, and the moveable clamping unit part 102 is moved towards the stationary clamping unit 103 whereby the second stationary mold section 408 is combined with the first stationary mold section 407 in order to re-attach the second stationary mold section 408 with the first stationary mold section 407 and disconnect the second stationary mold section 408 with the moveable clamping unit part 102, which leaves the system ready for the normal production cycle to begin.

Since the secondary runners 411 are inclined, the wall between the secondary runners 411 and the chilling cavity 404 is not made so thin that it will deteriorate.

FIG. 5. Illustrated is a third preferred embodiment of the invention.

A cooled runner, hot runner, combination mold 501 has a moveable mold part 502 which is connected to the moveable clamping unit part 102 and a stationary mold part 503 which is connected to the stationary clamping unit 103. The stationary mold part 503 consists of a first section 517 which is attached to the stationary clamping unit 103 and a second section 518 is separated by a runner parting surface 519. The mold 501 includes two chilling cavities 504, each for enclosing a molded product 505 such as a drinking glass with a wall thickness of 0.85 mm. The cooled runner mold 501 also includes a sprue bushing 506 which meets the injection nozzle 106 and is connected to a hot runner manifold 507. The hot runner manifold 507 is connected to two hot runner nozzles 508. A hot primary runner system 509, positioned in the first section 517 of the stationary mold part 503, is channelled through The sprue bushing 506, passing through the hot runner manifold 507 and through the two hot runner nozzles 508 with gates 513 which lead to inclined secondary runners 511, positioned in the second stationary mold section 518. The inclined secondary runners 511 lead through restriction gates 512 to chilling cavities 504. Inside the hot primary runner system 509 and the inclined secondary runners 511 is polystyrene 510. The walls of the chilling cavities 504 contain a cavity cooling system 514. The hot runner manifold 507 contains a heating system of heating elements 515. Each chilling cavity 504 has a stripper sleeve 516. Illustrated is also mold opening direction 520.

The operation of the system which is illustrated in FIG. 5 and which is positioned as illustrated in FIG. 1, is as follows: hot molten polystyrene 510, such as high impact polystyrene, at a temperature of 230 degrees Centigrade and a pressure of 1500 kg per sq. cm., is injected into the hot primary runner system 509 by the injection unit 104 through the injection nozzles 106, is directed through the hot primary runner system 509, and enters through hot runner gates 513 the inclined secondary runners 511 with circular cross-sectional areas and with an average diameter of 15 mm and is conducted through the restriction gates 512 with circular cross-sectional areas with an average diameter of 2.0 mm into the chilling cavities 504.

While the molten plastic flows through the inclined secondary runners 511, heat is transferred to the walls of the inclined secondary runners 511, which have a temperature which is lower than the temperature of the flowing polystyrene because the walls of the inclined secondary runners 511 are cooled by the cavity cooling system 514 whereby the polystyrene in the inclined secondary runners 511 does not solidify in their entire circular cross-sectional region, but remains molten in a central zone of their circular cross-sectional region.

The heating elements 515 heat the hot primary runner system 509 in order to reduce or prevent heat loss from the directed polystyrene. The polystyrene which has entered the chilling cavities 504 is cooled in a short cooling period of 1.4 seconds by the cavity cooling system 514 whereby the cooled polystyrene solidifies, thereby creating a molded product 505.

The moveable clamping unit part 102 is moved away from the stationary clamping unit part 103 whereby the moveable mold part 502 is separated from the stationary mold part 503 and the molded product 505 is ejected by the stripper sleeve 516. Then the moveable clamping unit part 102 is moved toward the stationary clamping unit part 103 whereby the moveable mold part 502 is combined with the stationary mold part 503, which ends the normal production cycle with a cycle period of 2.5 seconds, and a new cycle is ready to begin.

When for some reason such as intent or malfunction, like a large impurity plugging a restriction gate 512, even though this gate has the large cross-sectional diameter of 0.2 mm, the normal production cycle is terminated, then the molten polystyrene within the inclined secondary runners 511 loses additional heat to the walls of the secondary runners 511, causing the molten polystyrene to solidify throughout its entire cross-sectional region.

The hot molten polystyrene 510 in the hot primary runner system 509 on the contrary does not solidify because the heating element 515 heats the hot runner system 509. The normal production cycle may hereafter be re-established by attaching the second stationary mold section 518 to the moveable clamping unit part 102 and disconnecting the second stationary mold section 518 from the first stationary mold section 517. Then the moveable clamping unit part 102 is moved away from the stationary clamping unit 103 whereby the second stationary mold section 518 is separated from the first stationary mold section 517 in order to expose the solidified impressions of the polystyrene in the inclined secondary runners 511, which are hereafter removed in such a manner that the impressions of the restriction gate 512 on the solidified impression of the inclined secondary runners 511 are removed through the inclined secondary runners 511 in a direction which is not parallel to the mold opening direction 517.

The moveable clamping unit part 102 is hereafter moved towards the stationary clamping unit 103 whereby the second stationary mold section 518 is combined with the first stationary mold section 517 in order to re-attach the second stationary mold section 518 with the first stationary mold section 517 and disconnect the second stationary mold section 518 with the moveable clamping unit part 102, which leaves the system ready for the normal production cycle to begin.

Impurities do not get trapped in the hot runner nozzles 508 because the openings of the hot runner gates 513 are not restricted. There is a certain heat transfer from the hot runner nozzle 508 to the walls of the chilling cavity 504, but this is too far removed from the walls of the chilling cavities 504 to cause any significant heating thereof.

Since the secondary runners 511 are inclined, the wall between the secondary runners 511 and the chilling cavity 504 is not made so thin that it will deteriorate.

While the above description contains many specificities, these should not be construed as limitations on the scope of the invention, but rather as an exemplification of the preferred embodiments thereof. Many other variations are possible, for example sandwich mold systems wherein the mold part which contains the secondary runners has chilling cavities on both sides of said mold part. Accordingly, the scope of the invention should be determined not by the embodiments illustrated, but by the appended claims and their legal equivalents.

I claim:

1. A method of cyclic multicavity plastic injection molding, wherein the employed mold comprises a product parting surface and a runner parting surface which is different from the product parting surface, and wherein each normal production cycle comprises the steps of:
    (a) injecting a hot molten plastic into a primary runner system of a multicavity mold;
    (b) directing the injected plastic through the primary runner system to some inclined secondary runners, which are positioned in the runner parting surface, and which connect the primary runner system with some restriction gates;
    (c) leading the directed plastic through the inclined secondary runners to the restriction gates which directly connect the inclined secondary runners with the chilling cavities;
    (d) cooling the led plastic in the inclined secondary runners by transferring heat from the plastic to the walls of the inclined secondary runners which have a temperature which is lower than the temperature of the led plastic in a manner so that the plastic in the inclined secondary runners does not solidify in their entire cross-sectional region but remains molten in a central zone of their cross-sectional region;
    (e) conducting the led cooled molten plastic through the restriction gates into the chilling cavities;
    (f) cooling the conducted plastic in the chilling cavities by the cavity cooling system whereby the cooled plastic solidifies thereby creating a molded product; and
    (g) separating the mold at the product parting surface and ejecting the molded product from the chilling cavities, which are positioned in the product parting surface, without ejecting any runner plastic impression;
        wherein when the normal production cycle is terminated, the led molten plastic within the inclined secondary runners transfers additional heat to the walls of the inclined secondary runners whereby the led molten plastic solidifies throughout its entire cross-sectional region; the method additionally comprising the following steps for reestablishing the normal production cycle following such termination:
    (h) separating the mold at the runner parting surface in order to expose the solidified impressions of the inclined secondary runners;
    (i) removing the solidified impressions of the inclined secondary runners in such a manner that the impressions of the restriction gate on the solidified impression of the inclined secondary runners are removed through the inclined secondary runners in a direction which is not parallel to the mold opening direction; and
    (j) recombining the mold at the runner parting surface which contains the inclined secondary runners.

2. A method according to claim 1 comprising the additional step of:
    (k) cooling the directed plastic in the primary runner system by transferring heat from the plastic to at least a division of the walls of the primary runner system which have a temperature which is lower than the temperature of the plastic in a manner so that the plastic in the whole or said division of the primary runner system does not solidify in its entire cross-sectional region but remains molten in a central zone of its cross-sectional region in order to reduce or prevent any leakage of the molten plastic between said two sections of the mold part which contain the inclined secondary runners.

3. A method of cyclic multicavity plastic injection molding, wherein the employed mold comprises a product parting surface and a runner parting surface which is different from the product parting surface, and wherein each normal production cycle comprises the steps of:
    (a) injecting a hot molten plastic into a primary runner system of a multicavity mold;
    (b) directed the injected plastic through the primary runner system to some inclined secondary runners, which are positioned in the runner parting surface, and which connect the primary runner system with some restriction gates;
    (c) heating at least a region of the walls of the primary runner system in order to reduce or prevent heat loss from the directed plastic to the region of the walls of the primary runner system;
    (d) leading the directed plastic through the inclined secondary runners to the restriction gates which directly connect the inclined secondary runners with the chilling cavities;
    (e) cooling the led plastic in the inclined secondary runners by transferring heat from the plastic to the walls of the inclined secondary runners which have a temperature which is lower than the temperature of the led plastic in a manner so that the plastic in the inclined secondary runners does not solidify in their entire cross-sectional region but remains molten in a central zone of their cross-sectional region;
    (f) conducting the led cooled molten plastic through the restriction gates into the chilling cavities;
    (g) cooling the conducted plastic in the chilling cavities by the cavity cooling system whereby the cooled plastic solidifies thereby creating a molded product; and
    (h) separating the mold at the product parting surface and ejecting the molded product from the chilling cavities, which are positioned in the product parting surface, without ejecting any runner plastic impression;
        wherein when the normal production cycle is terminated, the led molten plastic within the inclined secondary runners transfers additional heat to the walls of the inclined secondary runners whereby the led molten plastic solidifies throughout its entire cross-sectional region; the method additionally comprising the following steps for reestablishing the normal production cycle following such termination:
    (i) separating the mold at the runner parting surface in order to expose the solidified impressions of the inclined secondary runners;
    (j) removing the solidified impressions of the inclined secondary runners in such a manner that the impressions of the restriction gate on the solidified impression of the inclined secondary runners are removed through the inclined secondary runners in a direction which is not parallel to the mold opening direction; and (k) recombining the mold at the runner parting surface which contains the inclined secondary runners.

4. A method according to claim 2 wherein when the normal production cycle is terminated the directed plastic in the primary runner system solidifies throughout its entire cross-sectional region and wherein step (i) comprises the additional step of:

(k) subdividing the combined unit of the solidified impression of the plastic in the primary runner system and solidified impressions of the plastic in the inclined secondary runners in order to remove the solidified impressions of the plastic in the inclined secondary runners.

5. A method according to claim 2, wherein step (a) comprises the step of:

(k) injecting polystyrene at a high temperature and a high pressure into the primary runner system;

wherein step (b) comprises the step of:

(l) directing the injected polystyrene through primary runners having large cross-sectional areas;

wherein step (c) comprises the step of:

(m) leading the directed polystyrene through inclined secondary runners having large cross-sectional areas;

wherein step (e) comprises the step of:

(n) conducting the polystyrene through restriction gates having large cross-sectional areas; and wherein step (f) comprises the step of:

(o) cooling with a short cooling period the conducted polystyrene in the chilling cavities.

6. A method according to claim 5 wherein said polystyrene is general-purpose type polystyrene.

* * * * *